UNITED STATES PATENT OFFICE.

HENRY NOEL POTTER, OF NEW YORK, N. Y., ASSIGNOR TO GEORGE WESTINGHOUSE, OF PITTSBURG, PENNSYLVANIA.

PRINTING-INK.

No. 908,132.

Specification of Letters Patent.

Patented Dec. 29, 1908.

Application filed July 2, 1907. Serial No. 381,936.

*To all whom it may concern:*

Be it known that I, HENRY NOEL POTTER, a citizen of the United States, and resident of New York, county of New York, State of New York, have invented certain new and useful Improvements in Printing-Inks, of which the following is a specification.

I have invented certain new and improved printing inks hereinafter described.
It is well known that printing inks are of extremely diverse compositions to suit the particular uses intended or to meet the ideas of the particular ink maker as to quality, price, ease of working, durability, gloss, speed of drying, etc.

Inks may for present purposes be divided into fluid or writing inks and pasty or printing inks. With the latter, containing solid particles, this application is exclusively concerned.

Printing inks may be broadly classified as black inks and colored inks. All printing inks contain coloring matter and a varnish. The applicant is advised that black inks are made only of pigment and varnish, while colored inks usually contain a third ingredient called a "base". A base is understood to be a finely subdivided solid in general chemically inert to the other ink ingredients introduced to thicken the varnish and lessen the amount of relatively expensive dry coloring matter to be used to give the desired consistency.

A base may and often does materially affect the physical properties of the ink containing it so that certain substances are good bases, others are not.

The two bases most in use are probably aluminum hydrate for the best grades of ink, and blanc fixe or precipitated barium sulfate for cheaper grades and special purposes. Many other substances have been tried.

I have discovered that the extremely fine fluffy pulverulent soft brown substance described by me in my application #238,925, of December 30, 1904, and therein alleged to be silicon monoxid, the same having been made in considerable quantities by the applicant and called by him and his associates "monox", is a most excellent base for all printing inks, wherein its color is unobjectionable, whether because it blends into the color desired as in browns and greens, or because it is completely masked by the other color or colors used with it, as in reflex blues. The applicant is at present of the opinion that the said monox may vary in its chemical composition from simply silicon monoxid to a chemically dissociated material in which the silicon monoxid is more or less broken up into silicon and silicon dioxid. It may also contain impurities and an excess of silica.

By monox is meant the material resulting from the partial reduction of silicon dioxid whether the said material is more or less chemically dissociated or not, as this can only be detected by delicate thermo chemical means and has no industrial bearing in the present specification. This monox base is applicable with advantage to most dark inks including blacks of the better grade, and in such blacks as "Peerless" gas black and other superior blacks monox may replace from ⅛ to ¼ of the black without injury to the color or opacity of the resulting inks and with positive advantage in the working qualities of the inks for half tone and other difficult printing. One advantage lies in the evenness of spreading by the ink rollers and a reduced tendency to fill up the screen of half tone plates. With inks containing this base a greater uniformity in the resulting prints is easily accomplished and a greater number can be printed before it is necessary to "wash out" the cut. The inks feed better in the ink fountain of the press and possess minor advantages which the pressman is quick to appreciate. In addition to its use in black inks which heretofore have rarely if ever had bases in them, it gives its peculiar advantages in browns, dark blues, greens and reds, and puts these inks on a par with black ink in working qualities.

The varnish used has of course much to do with the properties of ink and in cheap work the cost of ink must be very low. Obviously these low-priced inks cannot contain the more expensive ingredients of high priced inks, but substitute rosin oil for burnt linseed oil and even introduce a considerable proportion of mineral paraffin oils and many other cheapeners. The advantages of my new base extend also to these inks as this base permits the accomplishment of acceptable results with cheap varnish mixtures which would be practically impossible with blanc fixe, for example. This monox base being of extreme fineness and not caked into lumps can be incorporated into the ink mixtures with a minimum of grinding and the cost of this operation materially reduced.

I give a working formula for each of several shades of inks a suitable varnish assumed and used in quantity to give ink of the consistency desired.

1. "*Monox Cut Black.*"

| | |
|---|---|
| Carbon black | 84 parts by weight |
| Monox | 28 " " " |
| Reflex blue | 7 " " " |
| Varnish and drier liquids | Q. S. |

2. "*Monox Reflex Blue.*"

| | |
|---|---|
| Reflex blue paste | 40 parts by weight |
| Monox | 100 " " " |
| Varnish and drier liquids | Q. S. |

3. "*Monox Chrome Green.*"

| | |
|---|---|
| Chrome green | 40 parts by weight |
| Monox | 90 " " " |
| Varnish, etc | Q. S. |

I claim as my invention:

1. A printing ink containing as one ingredient the finely divided product of the partial reduction of silica, substantially as described.

2. A printing ink containing silicon monoxid.

3. A printing ink containing silicon monoxid in a partially dissociated condition.

4. A printing ink containing a finely divided brown solid composed of silicon and less oxygen than is contained in an equal weight of silicon dioxid.

5. A printing ink composed essentially of a drying varnish, coloring matter and silicon monoxid.

6. A printing ink composed essentially of a drying varnish, a black pigment, and silicon monoxid.

Signed at New York, in the county of New York, and State of New York, this 28th day of June A. D. 1907.

HENRY NOEL POTTER.

Witnesses:
 WM. H. CAPEL,
 THOS. H. BROWN.